United States Patent Office 3,243,345
Patented Mar. 29, 1966

3,243,345
STABLE LONG-ACTING ADRENOCORTICO-
TROPIC HORMONE PREPARATIONS
Evert de Jager, 20 Vijversingel, Oss, Netherlands
No Drawing. Filed July 25, 1962, Ser. No. 212,454
Claims priority, application Netherlands, Aug. 10, 1961, 268,104
4 Claims. (Cl. 167—74)

The invention relates to preparations of the adrenocorticotropic hormone (A.C.T.H.) having an enhanced and prolonged activity, distinguished from the known preparations by their greater stability.

From Netherlands patent specification 81,943 ACTH-preparations suitable for injection are known, in which the hormone is combined with one or more hydroxides or oxides of metals delaying the resorption of protein hormones, for example zinc hydroxide, nickel hydroxide and cobalt hydroxide.

Netherlands patent specification 94,384 describes suspensions of ACTH containing zinc that are prepared by the method of Netherlands patent specification 81,943 and are characterized by the application of electrolytically prepared α-zinc hydroxide. The particles of these suspensions are smaller than those of the suspensions known before now, in consequence of which suspensions thereof are more readily dispersible. Furthermore they stand freezing and subsequent defrosting without any detrimental effects.

It has been found now that by adding a member of the group consisting of an acid derived from an oxide of phosphorus, an ester thereof and a therapeutically suitable salt of said acid and ester, in a quantity of about 0.05–0.70 mg. equivalent $PO_4$ per mg. equivalent zinc to the said ACTH preparations with zinc hydroxide, suspensions are obtained with strongly enhanced stability. The suspensions according to the invention show an unexpectedly great stability relative to the corresponding suspensions without such an addition. It has proved from experiments that only the addition of the intended substances within the mentioned limits gives a significant improvement of the stability. Addition of quantities over 0.70 mg. equivalent per mg. equivalent zinc leads to preparations which after an accelerated stability test contain large crystals of the corresponding zinc compound and are therefore unsuitable for injection. Addition of quantities under 0.05 mg. equivalent yields preparations without a significant improvement of the stability. The experiments referring to the above limits are described in Example IV.

It need not be emphasized that pharmaceutical preparations of greater stability are far preferred over those having a lower stability because they offer greater security in regard to their activity. A further advantage of the preparations according to this invention is that by the said addition the resuspensibility has appreciably improved.

As examples of acids derived from an oxide of phosphorus are mentioned: metaphosphoric acid, phosphorous acid, orthophosphoric acid, pyrophosphoric acid and polyphosphoric acid. By derivatives of these acids are understood therapeutically suitable salts of these acids and organic phosphorus compounds, in particular the phosphate esters of nucleotides, carbohydrates, polyalcohols and amino acids and salts thereof.

As examples are mentioned primary, secondary and tertiary sodium-, potassium- and ammonium salts of the acids derived from an oxide of phosphorus, further glycero-phosphates, fructose-, ribose- and glucose phosphates and nucleoside phosphates such as adenosine mono-, di- and triphosphate and cytidin phosphates, as well as creatine phosphates and phosphoserine.

Further it has been found that an appreciable improvement may be observed in the said properties when the preparation is manufactured from ACTH with a potency of 10 or more U.S.P. u. per mg. The term U.S.P. u. as used herein with respect to the biological activity refers to U.S. Pharmacopoeia units as determined by the subcutaneous method. Orthophosphoric acid and its salts and esters are given preference as they give the best results in the pharmacological test to be discussed hereafter. The action of the preparations to which a polyphosphate has been added proves to be undiminished after an accelerated stability test, consisting in a three weeks' storage at 45° C. The stability of the preparations containing a pyrophosphate may also be called very good as compared with the stability of the preparations manufactured without the addition according to the invention.

The pharmacological test by which the prolonged action was determined is based in principle on the so-called Sayers test or ascorbic acid depletion test described in Endocrinology 42, 379 (1948). But instead of an intravenous injection of an ACTH-preparation 3 U.S.P. u. of ACTH, in the form of a combination preparation with zinc hydroxide, are now administered subcutaneously and that to a group of about 8 rats. To another group of rats the same amount of U.S.P. u. of an ACTH standard preparation without zinc hydroxide is administered subcutaneously. After 24 hours the ascorbic acid content of the left and the right adrenal together of the rats of the two groups is determined. The difference in the average ascorbic acid contents of the adrenals of the group of rats treated with the long acting preparation and of the group of rats treated with the standard preparation now serves as a standard for the prolonged action.

Finally it has been found that top results are obtained when use is made of a quantity of about 0.1–0.5 mg. equivalent of one or more of the phosphoric acids or derivatives thereof per mg. equivalent of zinc.

In the examples following hereafter the manufacture is described of the various ACTH-preparations according to the invention and the results of the determinations of the prolonged action, whether or not after accelerated stability tests.

Example I

An ACTH solution of the following composition

ACTH _____ 200 U.S.P. u./ml. (potency 92 u./mg.).
Zinc _____ 10.0 mg./ml.
$Na_2HPO_4 \cdot 12H_2O$ _____ 8.3 mg./ml.

is adjusted at pH 2 with a small amount of molar HCl. The zinc is supplied in the form of $ZnCl_2$. While stirring, 15 ml. of this solution and 0.6 molar sodium hydroxide solution are added simultaneously and dropwise to 25 ml. of a solvent, having the following composition:

Benzylalcohol _____ 20 mg./ml.
NaCl _____ 3 mg./ml.

During the addition of the acid ACTH-Zn-phosphate solution and the sodium hydroxide, the pH is kept constant at 8.0. The amount of sodium hydroxide used was 8.10 ml. The total volume is adjusted with distilled water to 50 ml. The composition of the suspension prepared in this way is:

Benzylalcohol _____ 10 mg./ml.
NaCl _____ 7.1 mg./ml.
ACTH _____ 60 U.S.P. u./ml.
Zinc _____ 3 mg./ml.
$PO_4$ _____ 0.66 mg./ml. (0.23 mg. equiv. $PO_4$ per mg. equiv. Zn).

In exactly the same manner a similar suspension was prepared containing the same ingredients, but the addition of $PO_4$ in the form of $Na_2HPO_4$ was omitted. Both suspensions were tested in the earlier mentioned test on prolonged activity.

The following results were obtained:

|  | Ascorbic acid depletion in µg./100 mg. adrenal weight | |
| --- | --- | --- |
|  | Fresh suspension | After storage for 3 weeks at 45° C. |
| Suspension without phosphate | 173 | 104 |
| Suspension with phosphate | 221 | 174 |

These data clearly indicate, that the stability of the suspension containing phosphate has improved. The duration of the action of the fresh suspension has also improved.

Example II

By the method of Example I a number of suspensions were prepared of the same composition as mentioned in Example I, adding 2.5 mg. of $Na_2HPO_4$ 12 aq. (0.23 mg. equiv. $PO_4$/mg. equiv. Zn) and 1.0 mg. $Na_5P_3O_{10}$ (0.27 mg. equiv. $PO_4$ per mg. equiv. Zn) per ml., respectively.

The results of the test for prolonged activity, expressed in µg. of ascorbic acid per 100 mg. of adrenal, were as follows:

|  | Ascorbic acid depletion in µg./100 mg. adrenal weight | |
| --- | --- | --- |
|  | Fresh suspension | After storage for 3 weeks at 45° C. |
| Suspension without addition | 196 | 56 |
| Suspension with phosphate | 234 | 164 |
| Suspension with polyphosphate | 169 | 172 |

The above shows that the preparation containing phosphate and the one containing polyphosphate are far preferable to the preparation without addition as regards stability. Further it proves that the freshly prepared preparation with phosphate shows the longest activity.

Example III

In the same manner as described in Example I an ACTH-preparation was made with sodium pyrophosphate 10 aq. in a quantity of 1.73 mg. (0.26 mg. equiv. $PO_4$ per mg. equiv. Zn) per ml. as extra addition and compared with suspensions of the composition described before. The following results (expressed in µg. of ascorbic acid per 100 mg. of adrenal) were obtained with the test for prolonged activity

|  | Ascorbic acid depletion in µg./100 mg. adrenal weight | |
| --- | --- | --- |
|  | Fresh suspension | After storage for 3 weeks at 45° C. |
| Suspension without addition | 165 | 81 |
| Suspension with phosphate | 220 | 183 |
| Suspension with pyrophosphate | 188 | 130 |
| Suspension with polyphosphate | 146 | 157 |

Hence the addition of pyrophosphate causes a considerable increase in stability as compared with the preparation without this addition.

Example IV

By the method of Example I ACTH-suspensions were made with 60 U.S.P. u./ml. of ACTH, 3 mg. of zinc per ml. and further the same quantities of benzyl alcohol, and NaCl as mentioned in Example I, but with different quantities of $Na_2HPO_4$; see the table below. The test for prolonged activity gave the following results, expressed in µg. of ascorbic acid per 100 mg. of adrenal;

|  | Mg. eq. $PO_4$/mg. eq. Zn | Ascorbic acid depletion in µg./100 mg. adrenal weight | |
| --- | --- | --- | --- |
|  |  | Fresh suspension | After storage for 3 weeks at 45° C. |
| Suspension without phosphate | 0.00 | 109 | 43 |
| Suspension with 0.12 mg. $PO_4$ | 0.04 | 125 | 47 |
| Suspension with 0.15 mg. $PO_4$ | 0.05 | 121 | 91 |
| Suspension with 0.20 mg. $PO_4$ | 0.07 | 140 | 88 |
| Suspension with 0.33 mg. $PO_4$ | 0.11 | 156 | 94 |
| Suspension with 0.67 mg. $PO_4$ | 0.23 | 160 | 96 |
| Suspension with 1.33 mg. $PO_4$ | 0.46 | 147 | 120 |
| Suspension with 2.0 mg. $PO_4$ | 0.69 | 155 | 103 |

The data in this table show, that the addition of 0.05–0.70 mg. equivalent $PO_4$ per mg. equivalent Zn improves the stability of the preparation. Higher amounts of $PO_4$ yielded preparations in which large crystals were found after storage for 3 weeks at 45° C.

Similar results have been obtained with other acids derived from an oxide of phosphorus and their derivatives.

Example V

In a comparative experiment a number of phosphate esters were tested by the before-mentioned test. For that purpose suspensions were prepared of 40 u./ml. of ACTH with 2 mg. of Zn with as additions β glycero phosphate, glucose-1 phosphate and adenosine triphosphate in such quantities that in each case 0.45 mg. of $PO_4$ per ml. was present. The results of the biological test, expressed in µg. of ascorbic acid per 100 mg. of adrenal, were as follows:

|  | Ascorbic acid depletion in µg./100 mg. adrenal weight | |
| --- | --- | --- |
|  | Fresh suspension | After storage for 3 weeks at 45° C. |
| Suspension without addition | 170 | 111 |
| Suspension with β glycerophosphate | 214 | 199 |
| Suspension with glucose-1 phosphate | 210 | 186 |
| Suspension with adenosine triphosphate | 194 | 184 |

These data clearly show the favourable effect of organic phosphate compounds on the stability. Both with the freshly prepared suspension and the suspension stored at 45° C. a markedly intensified activity is observed in the biological test.

I claim:

1. A long-acting suspension of adrenocorticotropic hormone suitable for injection, and having strongly enhanced stability, comprising an aqueous suspension of a combination of adrenocorticotropic hormone and zinc hydroxide and containing further at least one member selected from the group consisting of: (a) an oxy acid of phosphorus, (b) an ester thereof derived from an alcohol selected from the group consisting of nucleosides, carbohydrates, polyalcohols, and hydroxy-amino acids, and (c) a pharmaceutically acceptable alkali metal salt selected from the group consisting of the primary, secondary, and tertiary sodium, potassium and ammonium salts of said acid and of said ester, in a quantity between about 0.05 and about 0.70 mg. equivalent $PO_4$ per mg. equivalent zinc.

2. A stable long-acting suspension of ACTH according to claim 1 in which the oxy acid of phosphorus is orthophosphoric acid.

3. A stable long-acting suspension of ACTH according to claim 1 containing the additional substance in a quantity of about 0.10–0.50 mg. equivalent per mg. equivalent zinc.

4. A stable long-acting suspension of ACTH according to claim 1 in which the ACTH has a potency of at least 10 U.S.P. u./mg.

References Cited by the Examiner

UNITED STATES PATENTS

| 2,734,016 | 2/1956 | Holtermann | 167—74 |
| 2,807,569 | 9/1957 | Homan et al. | 167—74 |
| 2,902,408 | 9/1959 | Bouman et al. | 167—74 |

OTHER REFERENCES

Chemical Abstracts (abstract of Albeauz-Fernet et al., Pathol. et biol., Seamine hop. 1956).

JULIAN S. LEVITT, *Primary Examiner.*

FRANK CACCIAPAGLIA, JR., *Examiner.*

MARTIN J. COHEN, EUGENE FRANK,
*Assistant Examiners.*